Feb. 20, 1923. 1,445,887
W. J. HOSCEIT
GENERAL SERVICE CAR
Filed Sept. 26, 1919 2 sheets-sheet 1
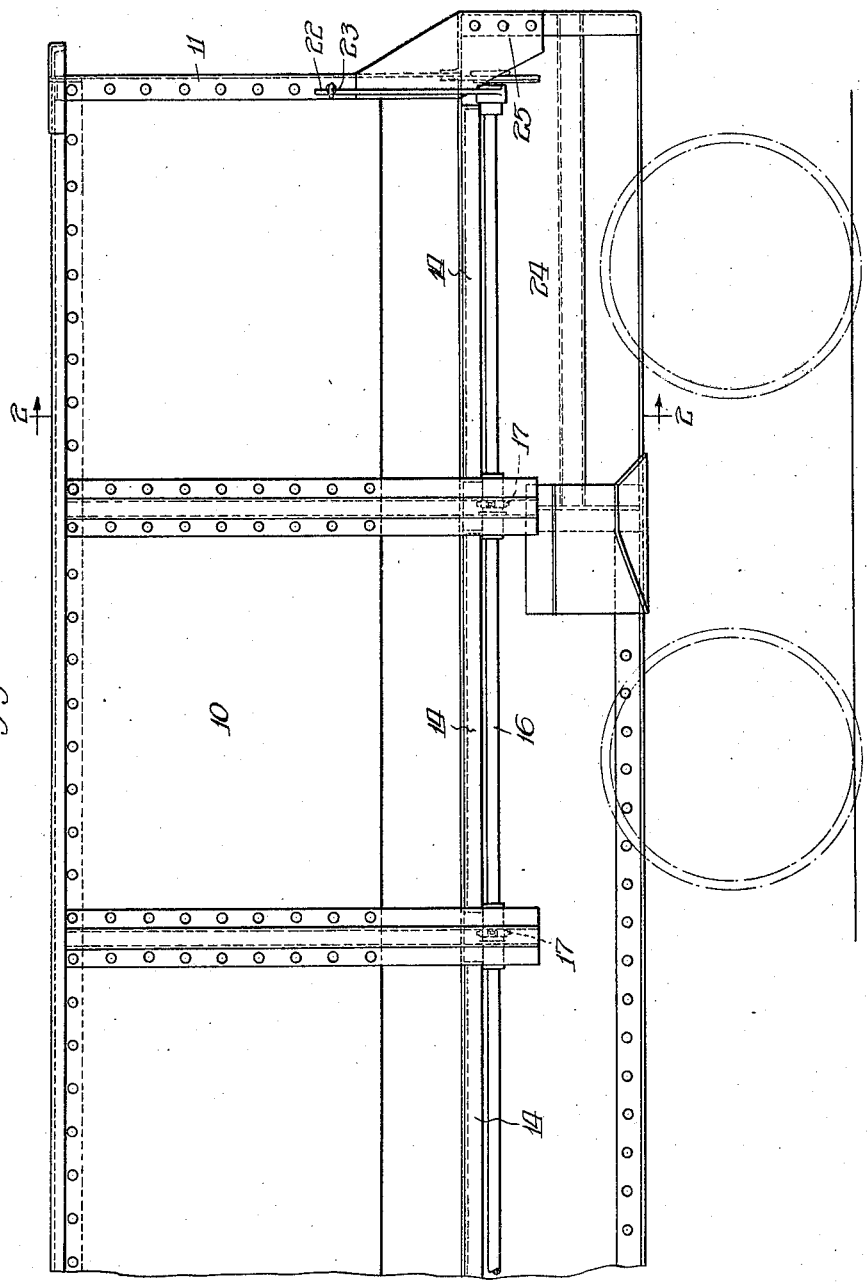
Witnesses
R Burkhardt
Chas. L. Byron
Inventor:
William J. Hosceit,
By Wilkinson + Huxley
Attys.

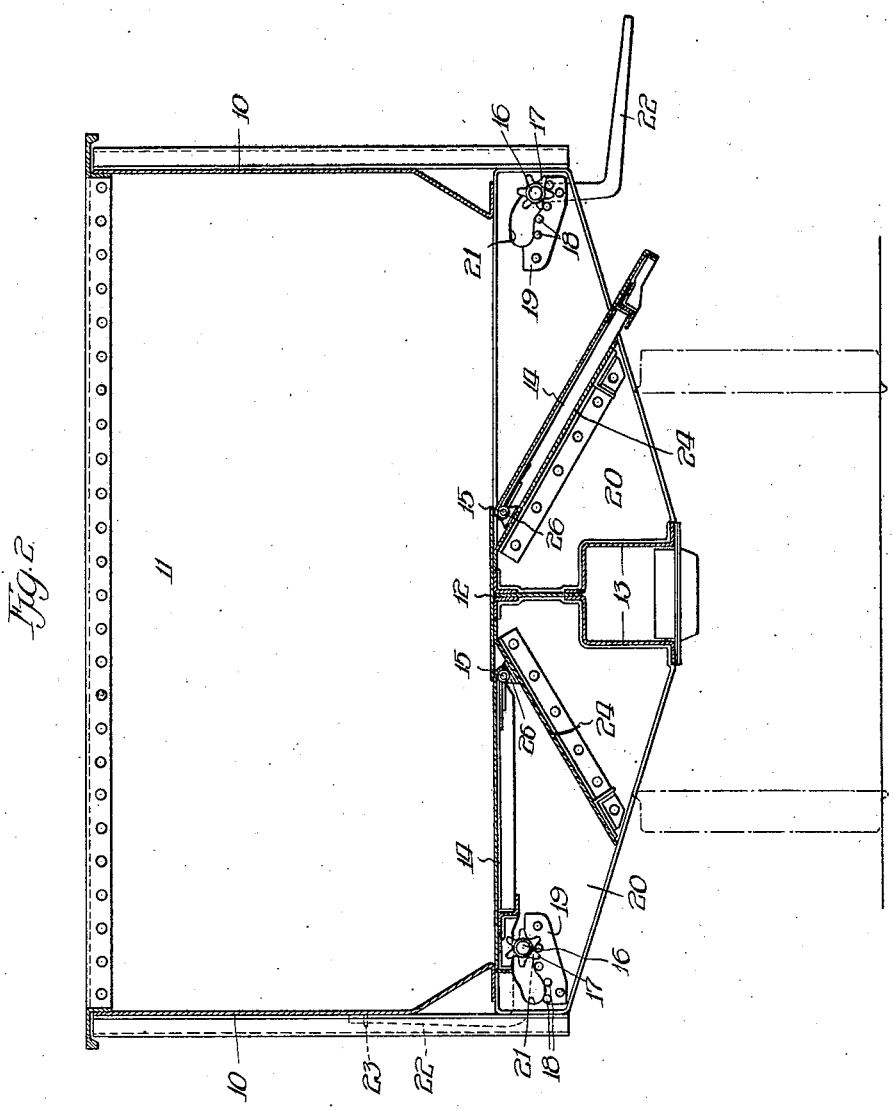

Patented Feb. 20, 1923.

1,445,887

UNITED STATES PATENT OFFICE.

WILLIAM J. HOSCEIT, OF CHICAGO, ILLINOIS, ASSIGNOR TO NATIONAL DUMP CAR COMPANY, OF CHICAGO, ILLINOIS, A CORPORATION OF MAINE.

GENERAL SERVICE CAR.

Application filed September 26, 1919. Serial No. 326,596.

*To all whom it may concern:*

Be it known that I, WILLIAM J. HOSCEIT, a citizen of the United States, residing at Chicago, in the county of Cook and State of Illinois, have invented certain new and useful Improvements in a General Service Car, of which the following is a specification.

This invention relates to general service cars, and more particularly to the frame and door construction thereof.

General service cars to be of the greatest utility should have the floors thereof formed substantially wholly of doors. It is simple enough to provide floor doors between the trucks and at the same time make the car frame sufficiently strong to overcome buffing and racking strains to which the frame is subject, but, in addition, to provide floor doors over the trucks and make the frame sufficiently strong, and at the same time relatively light, is a problem of considerable magnitude.

One object of my present invention is to construct a general service car having floor doors throughout its length and at the same time make the car frame strong enough in construction to overcome the buffing and racking strains to which the same is subjected, the weight of the frame being maintained at a minimum.

Another object is to provide a general service car simply and novelly constructed and adapted to meet the various requirements of service conditions.

These and other objects are accomplished by means of the car construction shown on the accompanying sheets of drawings, in which:—

Figure 1 is a fragmentary side elevation of a general service car embodying my invention; and, Figure 2 is a transverse sectional view of the same car taken over the trucks and in the plane of line 2—2 of Figure 1.

Referring to the figures of the drawings, it will be noted that this general service car includes sides 10, ends 11 and a floor, the longitudinal central portion 12 of which is flat and is supported over the center sills 13. The floor is formed substantially wholly of doors throughout its entire length, the doors being arranged on opposite sides of the center sill, and when in closed position being on the same level, or substantially so, with the floor portion 12. Not only do the floor doors 14 extend between the trucks, but they are also arranged over the trucks. As shown in Figure 2 of the drawings, it will be noted that the floor doors 14 are pivotally mounted at 15 along their inner ends on opposite sides of the center sill. These doors 14 are arranged to dump the load to the sides of the car. As viewed in Figure 2, the floor door 14 at the left-hand side is in closed position, and is held in such position by a supporting and operating shaft 16, which carries a plurality of gears 17 each of which meshes with a cooperating rack 18 formed in a bracket 19 carried by the body bolster 20 and other transverse frame members, said bolster and transverse frame member each being provided with a slot 21 whereby the shaft may move laterally inwardly and outwardly. As shown at the left-hand side of Figure 2, the shaft 16 occupies the innermost end of the slot 21 for holding the floor doors 14 in raised or closed position. To permit the floor doors 14 to swing downwardly into an open position for dumping purposes, the shaft 16 is moved laterally outwardly to the outer end of the slot 21, whereupon the doors 14 are free to drop into open position, as shown in the righthand side of Figure 2. The shaft 16 in each case may be operated by any suitable handle 22, which in this case is angular in shape to pass around the lower edges of the car, the handle being held in its raised position by any suitable means 23.

As mentioned hereinabove, it is a simple matter to make the frame construction sufficiently strong to overcome buffing and racking strains when floor doors are used only between the trucks, but a difficult problem is presented when, in addition, floor doors are provided over the trucks. Even though a car frame may be relatively rigid, if there are a large number of floor doors, the frame soon will be skewed and forced out of shape under service conditions, unless a special construction is provided. This is especially so in the present case where not only floor doors are used between the trucks, but where floor doors additionally are provided over the trucks. To overcome these buffing and racking strains and to stiffen the frame of the car at the vital points, I have provided longitudinally extending rigid reinforcing frame members or plates 24 which extend between and are rigidly connected to the body bolster 20 and end sill 25 at the ends of the car. The rigid plate 24 at each end of the car is bent, the top portion thereof being mounted upon and over the center sill 13 and intermediate the latter and the floor plate 12. The inclined side portions of the plate 24 extend from the top of the center sill in a downwardly and outwardly direction toward the sides of the car. The inclined portions of the plate 24 are located on either side of the center sill intermediate the latter and the sides of the car. These rigid A-shaped plates 24 at each end cover a considerable distance transversely of the car. They also form stops for the floor doors 14 over the trucks and also support the brackets 26 to which the doors 14 are pivoted.

By means of this construction the floor of the car may be formed substantially wholly of doors throughout its entire length and including floor doors over the trucks, the car frame at the same time being properly constructed to overcome the buffing and racking strains encountered under service conditions.

It is my intention to cover all modifications of the invention falling within the spirit and scope of the following claims.

I claim:

1. A general service car having sides, ends and a floor, the latter being formed substantially wholly of doors throughout its length and including floor doors over the trucks, and rigid frame members extending between an end sill and body bolster for strengthening the frame and also serving as a stop for an associated door; the frame members diagonally of the depth of the body bolster and end sill and within their contour.

2. A general service car having sides, center sills, ends and a floor, the latter being formed substantially of doors throughout its length and including floor doors over the trucks, and inclined reinforcing members extending from a point adjacent the top of the center sill downwardly and outwardly toward the sides of the car and being secured to the associated end sills and body bolsters the end sills and bolster being adjacent the center sills substantially of equal depth with the center sills.

3. A general service car having sides, center sills, ends and a floor, the latter being formed substantially of doors throughout its length and including floor doors over the trucks, and a plate member located laterally from the center sill and extending downwardly and outwardly toward the sides of the car and being secured to an end sill and bolster the end sills and bolster being adjacent the center sills substantially of equal depth with the center sills.

4. A general service car having an underframe comprising a center sill and cross members extending from the center sill toward the sides of the car, a substantially horizontal floor from end to end of the car composed largely of drop doors hinged at or near the center sill, and rigid frame members below the floor on either side of the center sill extending between the end sills and body bolsters and connected thereto, said end sills and body bolsters being equal in depth to the center sills.

5. A general service car having an underframe comprising a center sill and cross members extending from the center sill toward the sides of the car forming rectangular openings, a substantially horizontal floor extending from end to end of the car comprising doors hinged at or near the center sill, said doors filling said openings when in closed position, and rigid inclined frame members below the floor at the ends of the car, said members extending between the end sills and body bolsters and being connected thereto, said end sills and body bolsters being equal in depth to the center sills.

Signed at Chicago, Illinois, this 23rd day of September, 1919.

WILLIAM J. HOSCEIT.